United States Patent [19]

Hylton

[11] 4,452,755

[45] Jun. 5, 1984

[54] FUEL ROD RETENTION DEVICE FOR A NUCLEAR REACTOR

[75] Inventor: Charles L. Hylton, Madison Heights, Va.

[73] Assignee: The United States of America as represented by the United States Department of Energy, Washington, D.C.

[21] Appl. No.: 343,793

[22] Filed: Jan. 29, 1982

[51] Int. Cl.³ .............................................. G21C 7/08
[52] U.S. Cl. .................................. 376/364; 376/440; 376/446
[58] Field of Search ................ 376/261, 364, 440, 446

[56] References Cited

U.S. PATENT DOCUMENTS

| | | | |
|---|---|---|---|
| 3,105,026 | 9/1963 | Dickson | 376/440 |
| 3,255,091 | 6/1966 | Frisch | 376/446 |
| 3,349,004 | 10/1967 | Lass et al. | 376/440 |
| 3,431,170 | 3/1969 | Lass et al. | 376/446 |
| 3,665,586 | 5/1972 | Jabsen | 376/446 |
| 3,741,868 | 6/1973 | Qurnell et al. | 376/440 |
| 3,769,158 | 10/1973 | Winders | 376/440 |
| 3,795,040 | 3/1974 | Jabsen | 376/446 |
| 3,892,027 | 7/1975 | Jabsen | 376/446 |
| 3,992,259 | 11/1976 | Anthony et al. | 376/440 |
| 4,064,004 | 12/1977 | Long et al. | 376/440 |
| 4,292,130 | 9/1981 | Viaud et al. | 376/446 |
| 4,304,631 | 12/1981 | Walton et al. | 376/364 |
| 4,366,116 | 12/1982 | Christiansen et al. | 376/446 |
| 4,381,284 | 4/1983 | Gjertsen | 376/446 |

OTHER PUBLICATIONS

"Impact of Gov. Policy on Fuel Design and Fuel Management" Am. Pow. Conf., Chicago, IL (4/25/79) Sankovich et al.
"The Effect of Fuel Rod Design on SCC Susceptibility", ANS Meeting, Portland, Oreg., 5/3/79, Wilson et al.
"Extended Burnup–Fuel Develop. & Performance", ANS Meeting, Portland, Oreg. 5/3/79, Tulenko et al.

Primary Examiner—Sal Cangialosi
Attorney, Agent, or Firm—Sandra B. Weiss; John M. Albrecht; Michael F. Esposito

[57] ABSTRACT

A device is described for supporting a nuclear fuel rod in a fuel rod assembly which allows the rod to be removed without disturbing other rods in the assembly. A fuel rod cap connects the rod to a bolt which is supported in the assembly end fitting by means of a locking assembly. The device is designed so that the bolt is held securely during normal reactor operation yet may be easily disengaged and the fuel rod removed when desired.

10 Claims, 3 Drawing Figures

FUEL ROD RETENTION DEVICE FOR A NUCLEAR REACTOR

CONTRACTUAL ORIGIN OF THE INVENTION

The United States Government has rights in this invention pursuant to Contract No. DE-AC02-ET34213 between the U.S. Department of Energy and Babcock and Wilcox.

BACKGROUND OF THE INVENTION

This invention relates to a device for retaining a nuclear fuel rod in a nuclear fuel rod assembly and which allows the rod to be easily removed from the assembly. More specifically, this invention relates to a device for retaining a nuclear fuel rod in a nuclear fuel rod assembly and which allows the rod to be easily removed from the assembly without disturbing any other rods or support elements in the assembly.

Fuel for nuclear reactors is frequently manufactured in the form of elongated fuel rods. In a typical reactor design, fuel rods are arranged in parallel arrays called assemblies. Each assembly is supported in the reactor by a structural cage which allows the entire assembly to be handled together as a unit. Each cage comprises one upper and one lower end fitting at the ends of the assembly and control rods guide tubes extending between the end fittings. The end fittings comprise flat plates called grillages with a plurality of apertures therein, most of which are open to allow for the flow of coolant therethrough and the remainder of which are used to accommodate the ends of the fuel rods and guide tubes. Fastening means at each aperture secure the fuel rods and guide tubes to the grillage. Spacer grids located along the length of the fuel assembly serve to locate and support the fuel rods and guide tubes.

It is often desirable to remove a single fuel rod from an assembly in a nuclear reactor. This may be necessary in order to inspect the rod for research purposes. It would thus be desirable to be able to remove a single fuel rod without disturbing the other rods in the assembly or the end fittings. Also, the fastening means begin to deteriorate upon prolonged thermal stress and irradiation and should not be reused; therefore the fastening means should be removed from the assembly and discarded when a fuel rod is removed. Furthermore, because in the radioactive environment of a nuclear reactor such operations are necessarily performed by remote equipment, it would be desirable to remove both the fuel rod and its associated fastening means in a single operation.

Various attempts have been made to invent alternative types of end fittings to facilitate rod removal. Some of these have incorporated removable plates to allow easy access to an entire fuel rod assembly. Devices of this type include those described in U.S. Pat. No. 3,255,091, entitled "Fuel Arrangement for a Nuclear Reactor" to E. Frisch; U.S. Pat. No. 3,431,170, entitled "Nuclear Reactor Fuel Bundle" to J. L. Lass, et al; and U.S. Pat. No. 3,992,259 entitled, "Fuel Assembly for a Nuclear Reactor" to A. Anthony et al. Other devices have used tubular fittings with pins to retain the rod such as U.S. Pat. No. 3,349,004, entitled "Nuclear Reactor Fuel Bundle" to J. L. Lass et al. Often these devices have several disadvantages: they may require many steps to remove the rod, which makes remote operation difficult, or they may hinder fuel rod growth which normally occurs during irradiation. In addition, use of these devices may structurally weaken the entire fuel assembly.

SUMMARY OF THE INVENTION

It is thus one object of the invention to provide a device to facilitate removal of a single fuel rod from a nuclear fuel rod assembly.

It is another object of the invention to provide a device to facilitate removal of a single fuel rod from a nuclear fuel rod assembly without disturbing the end fitting or the other rods in the assembly.

It is yet another object of the invention to provide a device to facilitate removal of a single fuel rod from a nuclear fuel rod assembly without disturbing the end fittings or the other rods in the assembly by means of remote equipment.

Additional objects, advantages, and novel features of the invention will be set forth in part in the following description.

The invention is a device which supports a fuel rod in an aperture of the fuel assembly upper grillage such that the fuel rod may be easily removed by remote equipment. In accordance with the invention, the device comprises a ring, a locking element, and a hollow bolt; the ring being threaded on its inner surface and permanently affixed in an aperture of the upper grillage, the locking element removably engaged with the ring to allow axial movement but limited rotational movement of the locking element with respect to the ring, the locking element further having an aperture therethrough aligned in registration with the threaded ring, the hollow bolt having a shaft extending through the aligned apertures of the locking element and threaded ring, the bolt further being partially threaded to mate with the threaded ring, and the locking element being mounted on the bolt to move axially therewith such that the bolt and locking apparatus are allowed to rotate with respect to one another unless in locking engagement with one another. A fuel rod cap extends upwardly through and beyond the hollow bolt, thus coupling the fuel rod with the inventive device. The inner diameter of the bolt is narrower than a portion of the fuel rod cap below the bolt and the outer diameter of the bolt is wider than than the transverse dimension of the fuel rod cap and fuel rod. The head of the bolt has depressions against which the locking element may be deformed into locking engagement. When thus engaged, the device prevents axial or rotational movement of the hollow bolt during normal reactor operation and thus provides secure retention for the end cap and its associated fuel rod. To remove the fuel rod from the assembly, the hollow bolt is unscrewed from the threaded ring; the first turn releases the bolt from its locking engagement with the locking element and subsequent turns unscrew the bolt upward to disengage the threads of the bolt from the internal threads of the ring while axially moving the locking element therewith. Then a grappling tool is used to grasp and lift the portion of the fuel rod cap extending above the bolt, whereby the fuel rod cap, hollow bolt, locking element and fuel rod may be lifted out of the fuel assembly in a single operation, without disturbing any other fuel rods or end fittings.

The unique design of the invention offers several advantages. The fuel rod is positively retained by the device during normal reactor operation, in that uncontrolled upward movement of the fuel rod through the grillage would be prevented by engagement of the wider transverse dimension of the fuel rod end cap against the narrow duct of the hollow bolt above it. At the same time, the device does not hinder the axial growth which normally occurs when nuclear fuel rods are irradiated because the fuel rod cap may move axially within the hollow bolt. The locking element and hollow bolt, which begin to deteriorate when irradiated, are relatively inexpensive and may be discarded when the fuel rod is removed from the assembly. Finally, the simple design and operation of the device make it well suited to use with the remote equipment typically required in the radioactive environment of a nuclear reactor.

DETAILED DESCRIPTION OF THE INVENTION

The following is a detailed description of a preferred embodiment of the instant invention; other embodiments will be readily apparent to those skilled in the art.

Figure 1:
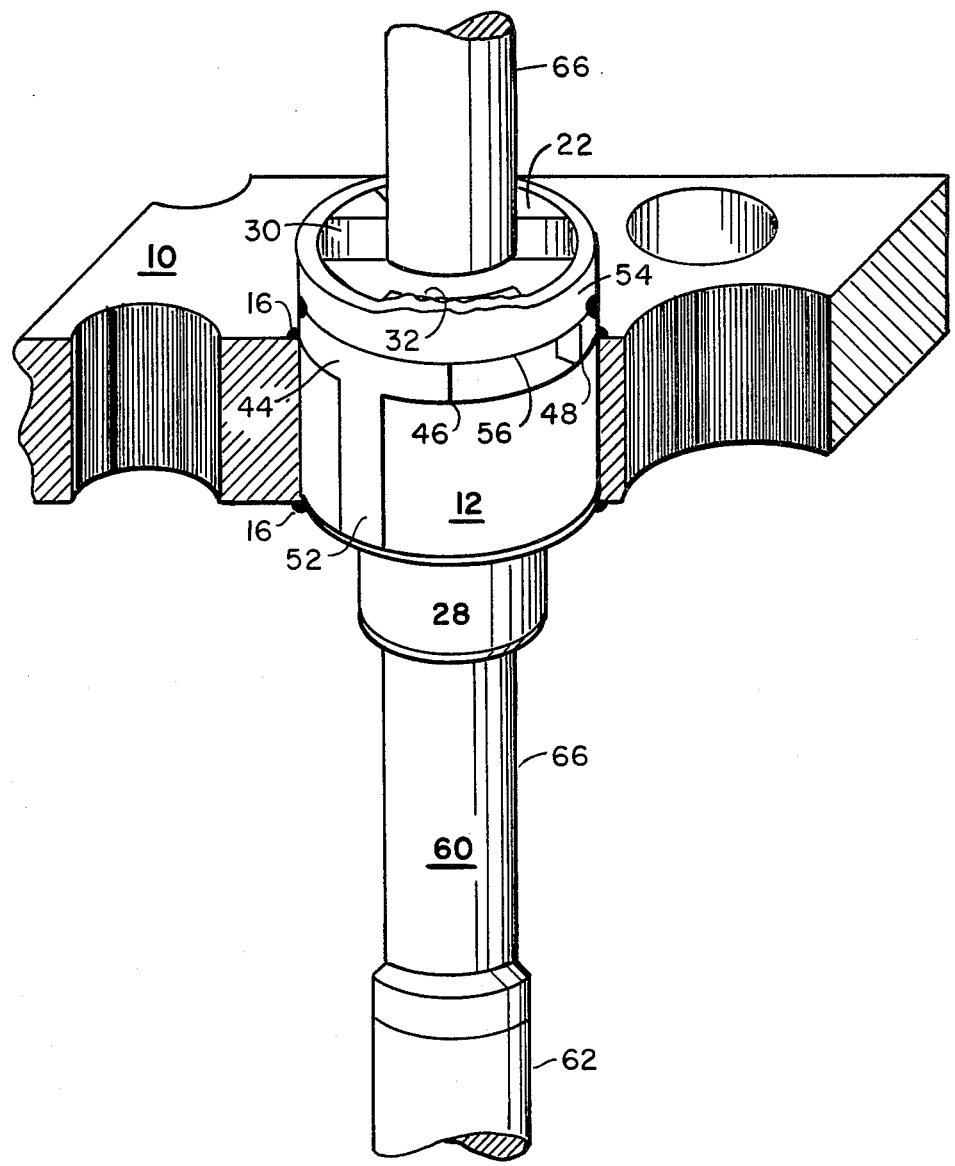
FIG. 1 illustrates a preferred embodiment of the invention with all its components assembled.
Figure 2:
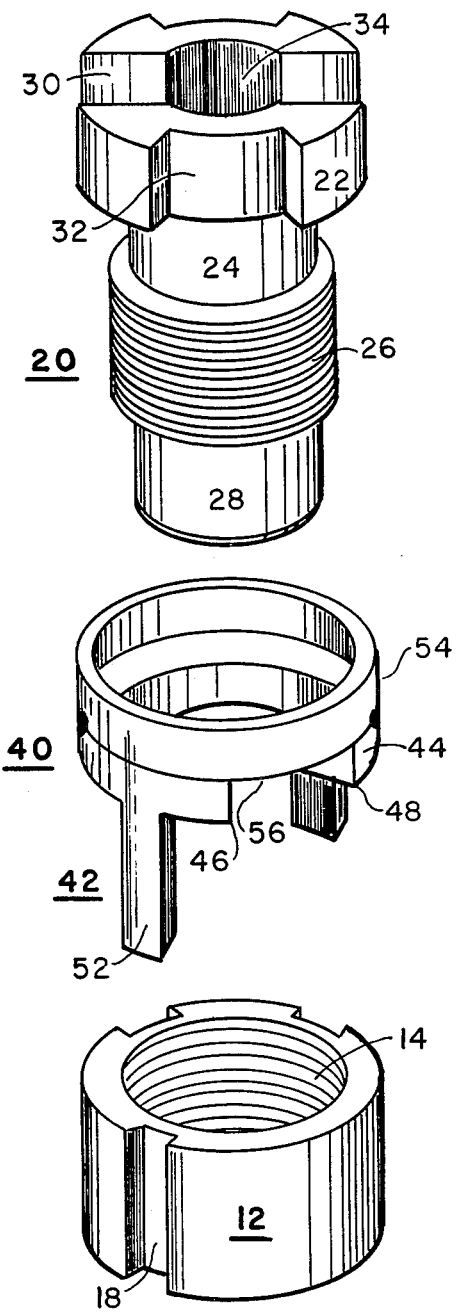
FIG. 2 illustrates a preferred embodiment of the invention with the components separated along a vertical axis.

FIG. 1 shows an elevational view of the assembled device positioned in a section of an upper grillage having a plurality of apertures. FIG. 2 shows the same device with its components separated along a vertical axis. An upper grillage 10 is shown to have an aperture fitted with a support member shown as a ring 12. The inner surface 14 of ring 12 is threaded. Ring 12 is permanently mounted in the grillage 10 by means of welds 16. The outer surface of ring 12 has three parallel channels 18 in the axial direction and extending the full length of ring 12 such that when ring 12 is mounted in grillage 10 the channels and the walls of the grillage aperture form three parallel slots. A retention member shown as a hollow bolt 20 comprises a head 22, a neck 24, a threaded portion 26, and a stem 28. The head 22 is provided with grooves 30 into which a mating tool may be inserted to rotate the bolt 20. The rim of head 22 is further provided with depressions 32 the purpose of which will be described infra. The bolt 20 is hollow such that it has a coaxial duct 34 therein.

Figure 3:
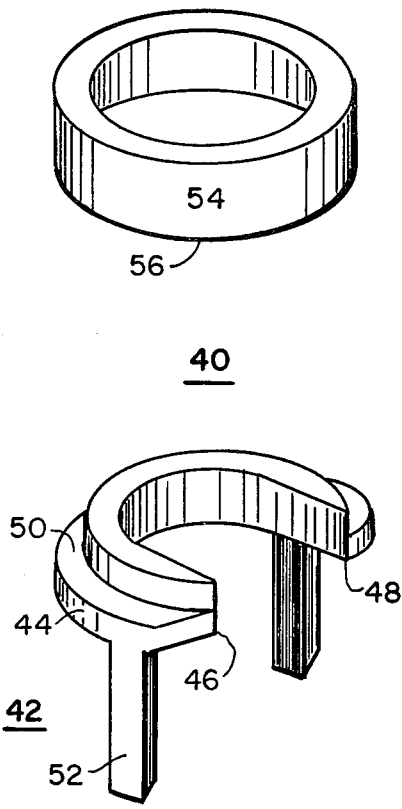
FIG. 3 is a detailed illustration of the locking apparatus.

The locking element 40 is illustrated in detail in FIG. 3. The locking element 40 comprises two components, a C-ring component 42 and a tube component 54. The C-ring component 42 has a generally annular section 44, the inner diameter of which is significantly smaller than the outer diameter. A portion of annular section 44 is cut away at end points 46 and 48 to form a shape similar to the letter "C". The direct distance between point 46 and point 48 is equal to the inner diameter of annular section 44. The inner diameter of annular section 44 is sized to accommodate neck 24 of bolt 20, but is smaller than the outer diameter of head 22 and threaded portion 26 of bolt 20 respectively. On one planar surface of annular section 44 along the outer circumference thereof runs a ledge 50. From the opposite planar surface of annular section 44 extend three locking feet 52, perpendicular to said planar surface, and sized and positioned to slidably fit into the three parallel channels 18 on the outer surface of ring 12. The tube component 54 is sized to accommodate ledge 50 such that a rim 56 of tube component 54 may be welded to C-ring component 42 at ledge 50. The inner diameter of tube component 54 is slightly larger than the outer diameter of bolt head 22.

The fuel rod cap 60 is shown in FIG. 1. It has a lower end 62 designed to connect with a fuel rod, an upper end not shown which may be designed to mate with a grappling tool, and an elongated generally cylindrical middle segment 66 therebetween. The middle segment 66 is sized to fit through duct 34 of bolt 20. The lower end 62 of fuel rod cap 60 is wider than duct 34 but is sized to fit through threaded ring 12.

The inventive device is used in the following manner: Bolt 20 and C-ring component 42 are joined by fitting annular section 44 around neck 24 of bolt 20 such that head 22 of bolt 20 is adjacent ledge 50. Tube component 54 is fitted around bolt head 22 and welded to C-ring component 42 at ledge 50. Thus C-ring component 42 and tube component 54 together form locking element 40 mounted on bolt 20 such that bolt 20 has free rotational movement but is restricted axially by annular section 44 nested between head 22 and threads 26. Bolt 20 with locking element 40 is slipped over end cap 60 such that stem 28 of bolt 20 rests on lower end 62 of fuel rod cap 60 which has been previously attached to a fuel rod while middle segment 66 of fuel rod cap 60 passes through duct 34 of bolt 20.

The upper end of fuel rod cap 60 is grasped by a grappling tool and lifted, thus lifting the entire apparatus described. The apparatus is positioned above the aperture in threaded ring 12 in grillage 10 and is lowered therethrough into the reactor. The fuel rod and lower end 62 of fuel rod cap 60 pass through the aperture of threaded ring 12; then as middle segment 66 of fuel rod cap 60 passes through ring 12, locking feet 52 of locking element 40 begin to slide into the three parallel slots formed by channels 18 and grillage 10, and bolt 20 begins to pass through the aperture of ring 12. A mating tool which fits grooves 30 of bolt head 22 is then used to screw bolt 20 into place such that its threaded portion 26 engages threaded surface 14 of ring 12. As bolt 20 is screwed into position it also moves locking element 40 axially downward. When bolt 20 is positioned in its retaining position, annular section 44 is supported by threaded ring 12, bolt head 22 is supported by an annular section 44, and locking feet 52 are fully enclosed in the parallel slots. Tube component 54 of locking element 40 is then crimped against bolt head depressions 32 to prevent any rotational movement of bolt 20. Fuel rod cap 60 and the fuel rod are axially positioned such that the lower end of the fuel rod engages the lower end fitting of the reactor. In this position middle segment 66 of fuel rod cap 60 extends several inches below hollow bolt 20 so that as the fuel rod expands axially during irradiation, middle segment 66 of fuel rod cap will move upwardly in duct 34 of bolt 20 and the inventive device will not hinder fuel rod growth.

When desired, the fuel rod may be easily removed by inserting the mating tool into grooves 30 of bolt head 22 and rotating bolt 20. The first turn releases bolt head 20 from crimped tube component 54 of locking element 40, and subsequent turnings unscrew threaded portion 26 of bolt 20 from threaded ring 12, raising bolt 20 above grillage 10. Locking element 40, whose annular section 44 is engaged by the shoulder of threaded portion 26, is raised above grillage 10 by bolt 20. The grappling tool is then used to grasp the upper end of fuel rod cap 60, and the cap 60 is lifted from the reactor, carrying with it bolt 20 which rests on lower end 62 of cap 60, locking element 40 which still surrounds bolt 20, and of course the fuel rod. Thus the fuel rod and all the components of the invention may be lifted out of the reactor in a single movement. It is readily apparent that the simple design and operation of the inventive device make it well suited to use with remote equipment.

It is clear from the foregoing description that many modifications of the invention are possible. For example, alternative methods of providing locking engagement between the locking element and the bolt head such as keys or retainers may be used instead of crimping. The bolt could be fastened to the grillage by bayonet or ratcheting connecting means instead of by means of a threaded bolt. The fuel rod end cap configuration could be modified according to the type of handling tool used. In addition, the invention may also be used in reactors in which the fuel rods are oriented non-vertically; for example the invention will facilitate rod removal equally well in reactors in which the fuel rods are in horizontal assemblies. These and other modifications will be readily apparent to one skilled in the art. The embodiment was chosen and described in order to best explain the principles of the invention and its practical application.

The embodiments of this invention in which an exclusive property or privilege is claimed are defined as follows:

1. A device for retaining a nuclear fuel rod in an aperture of a grillage of a nuclear fuel rod assembly comprising:
   a support member to be affixed to an aperture of said grillage;
   a retention member to be positioned to retain a fuel rod in said aperture of the grillage while allowing limited axial movement of said fuel rod with respect to the grillage;
   means for releasably connecting said retention member to said support member in said retaining position; and
   a locking element having means engageable with said retention member and said support member to lock said retention member in said retaining position to retain said fuel rod in said aperture.

2. The device of claim 1 wherein said means for releasably connecting said retention member to said support member provides for axial and rotational movement of said retention member relative to said support member during movement of said retention member into said retaining position,
   wherein said locking element further comprises means for mounting said locking element to said retention member to limit axial movement between said locking element and said retention member and to allow rotational movement between said locking element and said retention member.
   and wherein said means of said locking element engageable with said support member serves to limit rotational movement therebetween and to allow axial movement therebetween.

3. The device of claim 2 wherein said support member is a ring sized to accommodate said aperture and affixed therein.

4. The device of claim 3 wherein said retention member is a hollow bolt, having a head and a shaft, the interior diameter of said hollow bolt being sized to accommodate one end of a fuel rod cap affixed to said fuel rod and the exterior diameter of said shaft being sized to accommodate the interior diameter of said ring.

5. The device of claim 4 wherein said means for releasably connecting said retention member to said support member comprises threads on the exterior surface of said shaft of said hollow bolt, and threads on the interior surface of said ring, said bolt threads being axially spaced from said bolt head and said bolt threads sized to mate with the threads of said ring.

6. The device of claim 5 wherein said means for mounting said locking element to said retention member comprises in part a generally annular section of said locking element mounted on said bolt shaft between said bolt head and said bolt threads, thereby restricting the axial movement of said bolt with respect to said locking element.

7. The device of claim 6 wherein the exterior surface of said ring has channels therein in the axial direction and wherein the means of said locking element engagable with said ring comprises parallel feet sized and positioned to accommodate said channels to axially couple said locking element to said ring.

8. The device of claim 7 wherein said bolt head has a depression therein and said means of said locking element engagable with said bolt comprises an engaging portion which may be lockingly engaged into said depression of said bolt head to restrict the rotational movement thereof.

9. The device of claim 8 wherein said engaging portion is part of a tube surrounding said bolt head, said tube lockingly engaging said bolt head by being crimped into said depression thereof.

10. The device of claim 4 wherein said fuel rod cap affixed to said fuel rod comprises a first section adjacent said fuel rod and wider than the inner diameter of said hollow bolt, and a second section adjacent said first section and narrower than the inner diameter of said hollow bolt to enable said said second section to be positioned in and move axially within said hollow bolt.

* * * * *